2,800,513

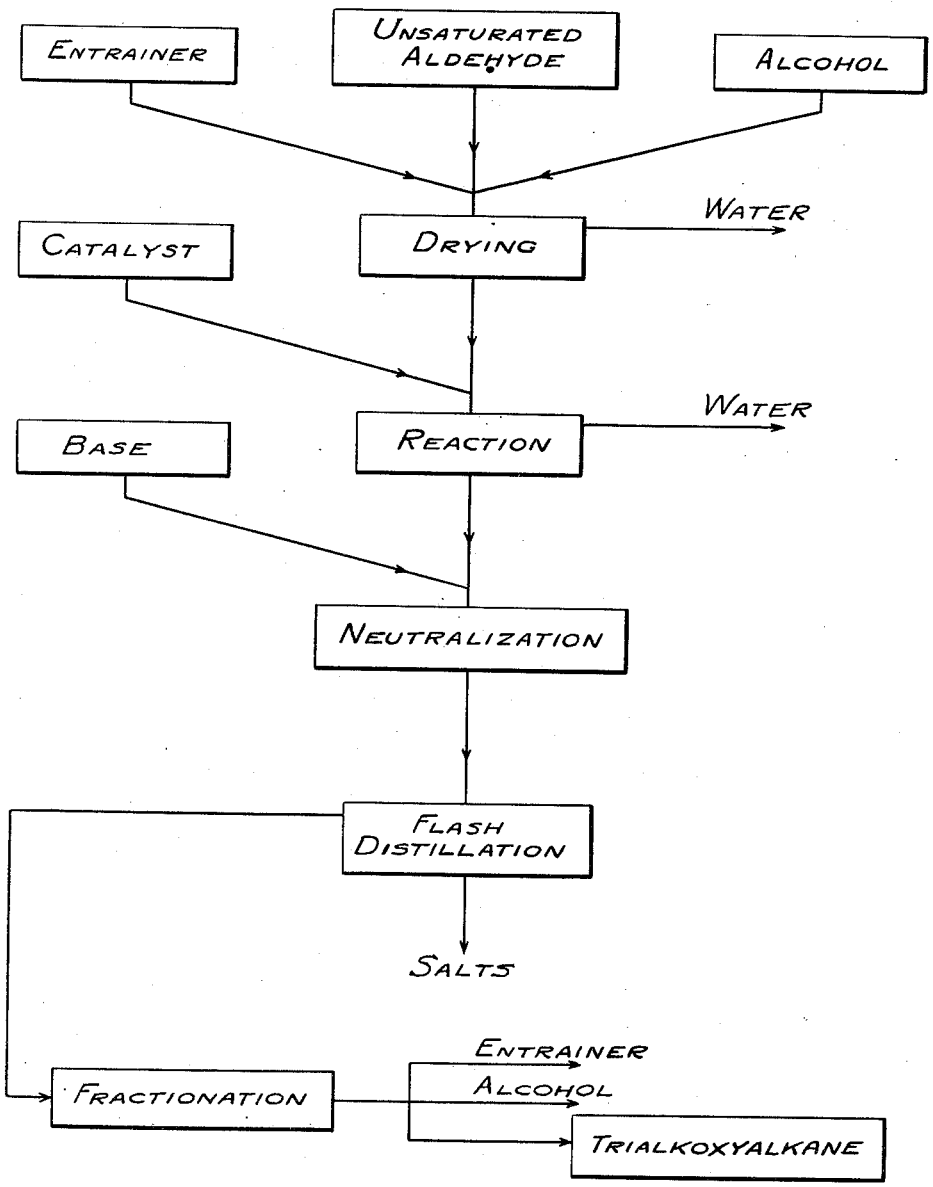

MANUFACTURE OF TRIALKOXYALKANES

Reginald Harold Hall, Sutton, and David Ian Hutchinson Jacobs, Carshalton, England, assignors to The Distillers Company Limited, Edinburgh, Scotland, a British company Application April 7, 1953, Serial No. 347,402

Claims priority, application Great Britain April 10, 1952

11 Claims. (Cl. 260—615)

The present invention relates to the production of trialkoxyalkanes and refers more particularly to an improved method for the production of 1,1,3-tri-sec-alkoxyalkanes which may be used as froth-flotation agents, solvents or organic intermediates.

The known method for the production of a 1,1,3-trialkoxyalkane comprises reacting an alpha-beta unsaturated aliphatic aldehyde with an alcohol in the presence of a condensation catalyst. The aldehyde starting materials, however, as normally obtained commercially, contain a certain amount of water. Such wet aldehydes cannot be obtained in the pure dry state in any simple manner, and distillation of the dry aldehyde normally involves a considerable loss of material owing to resinification and the like.

It has now been discovered that in order to obtain high yields of tri-sec-alkoxyalkanes as much water as possible must be eliminated from the reaction components before the condensation is effected. It has furthermore been discovered that by effecting this dehydration by forming a mixture comprising the wet unsaturated aldehyde and the entrainer and removing as an azeotrope the water present before starting the condensation reaction, improved yields of the tri-sec-alkoxyalkane are obtained while losses of the unsaturated aldehyde are reduced to a minimum.

Accordingly, the process for the production of a 1,1,3-tri-sec-alkoxyalkane comprises forming a mixture comprising a wet alpha-beta unsaturated lower aliphatic aldehyde and a water entrainer, removing water as an azeotrope with the entrainer, and reacting the aldehyde with a lower secondary alkanol in the presence of a condensation catalyst in the liquid phase while removing azeotropically the water liberated by the condensation reaction.

By the preceding statement we mean that the amount of water present in the reaction mixture when the condensation is started should be less than 9% by weight of the unsaturated aldehyde, preferably less than 2% and most desirably as small as possible.

As a preferred method of carrying out the process, a mixture of the unsaturated aldehyde, the secondary alcohol and the water entrainer is heated until no more water is removed from the mixture. The condensation catalyst is then added thereto to effect the condensation and the resulting mixture is heated until water ceases to distil over. However, if the alcohol is already dry, this ingredient may be added after the other components have been dehydrated.

The process of the invention may be applied with particular advantage to the lower alpha-beta unsaturated aldehydes containing from 3 to 8 carbon atoms which have a hydrogen atom in the alpha position, such as acrolein, crotonaldehyde and beta-methylcrotonaldehyde. However, the process is also useful for alpha-beta unsaturated aldehydes containing a similar number of carbon atoms and having an alkyl substituent in the alpha position, for example, alpha-methacrolein, alpha-ethylacrolein and alpha-neopentylacrolein. Secondary alkanols which may be used are those containing from 3 to 8 carbon atoms such as isopropanol, sec-butanol, 2-methyl-butan-3-ol, pentan-2-ol, pentan-3-ol and octan-2-ol.

The condensation may be carried out in the presence in the reaction mixture of a polymerisation inhibitor such as hydroquinone.

For the reaction the usual condensation catalysts may be used, for example: sulphuric acid, hydrochloric acid, phosphoric acid, organic sulphonic acids, boron trifluoride and its etherate, aluminum chloride, and also acid clays, acid zeolites, etc. As entraining agent for the water inert organic compounds which are known to entrain water may be used. Suitable compounds are hydrocarbons such as benzene and toluene, chlorinated hydrocarbons such as methylene dichloride and chloroform and ethers such as isopropyl ether.

Suitable temperatures for carrying out the reaction are from about 40° C. to about 100° C. or more, and are determined by the nature of the reactants, the nature and proportion of the entraining agent and the pressure under which the reaction is conducted. The advantages of the present invention are most marked in those cases where, because of economic considerations, the reaction must be carried out at higher temperatures within the above range, for instance at 60° C. or above. These conditions may arise, for example, when it is necessary to use a relatively small quantity of the entrainer, or a cheaper and higher boiling entrainer, and it is not possible to keep the temperature low by the use of reduced pressures.

The 1,1,3-tri-sec-alkoxyalkanes may be recovered from the reaction mixtures, after neutralisation of the condensation catalyst, by distillation. This may consist, for instance, of a simple fractionation under atmospheric or reduced pressure, or of a first distillation or flash distillation followed by fractionation.

The 1,1,3-tri-sec-alkoxyalkanes are valuable froth flotation agents and yield other valuable products, for instance on hydrolysis, hydrogenolysis or thermal cracking.

The process as herein set forth is shown on the accompanying flow sheet forming part of this application.

The following examples serve to illustrate the manner in which the process of the invention may be carried out in practice. The parts by weight are in the same relation to parts by volume as grams to cubic centimetres.

Example 1

To 136 parts by volume of wet acrolein containing 112 parts by weight of acrolein, 960 parts by weight of isopropanol, 800 parts by volume of methylene dichloride and 1.5 parts by weight of hydroquinone thoroughly dehydrated by azeotropic distillation, were added 4.19 parts by weight of anhydrous hydrogen chloride dissolved in 35 parts by volume of isopropanol. The mixture was heated and the water/methylene di-chloride azeotrope was distilled off by means of a 3 foot Vigreux column fitted with a decanting still head for top layer removal and lower layer return until no more water azeotrope distilled over. The reaction mixture was then treated with excess anhydrous sodium acetate and fractionated. After removal of methylene dichloride and excess isopropanol, the residual liquid was distilled under reduced pressure without fractionation to free it from inorganic salts and the distillate resulting therefrom subsequently fractionated. 1,1,3-tri-isopropoxypropane was obtained as a fraction boiling at 89° C. at a pressure of 10.5 mms. of mercury with a yield of 79% based on the acrolein charged.

The 2,4-dinitrophenylhydrazone of beta-isopropoxypropionaldehyde was prepared from the 1,1,3-tri-isopropoxypropane and crystallised from aqueous methanol in plates melting at 99° C. The product analysed as follows:

Found: C, 48.5%; H, 5.4%; N, 19.0%.
$C_{12}H_{16}O_5N_4$ requires: C, 48.65%; H, 5.45%; N, 18.9%

Example 2

A mixture of 57.7 parts by weight of acrolein containing 3% by weight of water and 0.1% hydroquinone, 480 parts by weight of isopropanol and 600 parts by volume of methylene dichloride to which 0.75 part by weight of additional hydroquinone was added, was boiled in a kettle connected to a 3 foot Vigreux column supporting a phase-separating still head which continuously decanted the upper aqueous layer in the distillate and returned the lower layer to the column as reflux. The temperature in the reaction mixture was 48° C.

When no more aqueous phase was being formed in the still head the contents of the kettle were allowed to cool slightly and then a solution of 2.39 parts by weight of anhydrous hydrogen chloride in 20 parts by volume of isopropanol was added thereto. Azeotropic distillation was restarted and continued until the evolution of water ceased. The reaction temperature was then 52° C.

The contents of the kettle which were pale brown in colour were cooled and treated as described in Example 1. 176 parts by weight of 1,1,3-tri-isopropoxypropane, boiling at 96.5°–97.5° C. at a pressure of 16 mms. of mercury, were recovered, which is a yield of 81% based on the acrolein charged.

Example 3

To 57.1 parts by weight of wet acrolein (97% pure), 300 parts by weight of isopropanol and 600 parts by volume of methylene dichloride was added 0.75 part by weight of hydroquinone. The mixture was dehydrated as in the previous example and, after cooling slightly, 2.37 parts by weight of anhydrous hydrogen chloride in 20 parts by volume of isopropanol were added. Azeotropic distillation was restarted and continued until no more water was liberated. The contents of the kettle were cooled and treated as described in Example 1.

The yield of 1,1,3-tri-isopropoxypropane was 78% on the acrolein charged.

Example 4

A mixture of 57.1 parts by weight of acrolein containing 2% by weight of water, 480 parts by weight of isopropanol, 600 parts by volume of methylene dichloride, and 0.75 part by weight of hydroquinone was dehydrated as described in Example 1, and after cooling slightly, 3.2 parts by weight of sulphuric acid (sp. gr. 1.84) dissolved in 16 parts by weight of isopropanol were added. Azeotropic distillation was restarted and continued until no more water was liberated, the final kettle temperature being 48° C.

The product was added gradually to a vessel containing a slight excess (calculated on the sulphuric acid employed) of concentrated aqueous potassium hydroxide solution from which it was distilled to recover methylene dichloride and isopropanol. The residual liquid was distilled without fractionation to free it from inorganic salts and the distillate resulting therefrom was subsequently fractionated. The yield of 1,1,3-tri-isopropoxypropane was 74%.

Example 5

Repetition of Example 4, but using only 0.64 part by weight of sulphuric acid (sp. gr. 1.84) dissolved in 16 parts by weight of isopropanol as catalyst, the other quantities of reagents being unchanged (except for the potassium hydroxide, the quantity of which was reduced proportionally), gave a yield of 1,1,3-tri-isopropoxypropane of 87%.

Example 6

Repetition of Example 2 but omitting the added 0.75 part by weight of hydroquinone and using acrolein containing only the usual 0.1–0.2% by weight of hydroquinone again gave a yield of 1,1,3-tri-isopropoxypropane of 81%.

Example 7

Repetition of Example 2 but employing only 0.83 part by weight of anhydrous hydrogen chloride dissolved in 5.6 parts by weight of isopropanol as catalyst furnished 1,1,3-tri-isopropoxypropane in a yield of 84%.

Example 8

A mixture of wet crotonaldehyde (78 parts by weight; containing 90.8% by weight crotonaldehyde), isopropanol (600 parts by volume), methylene dichloride (600 parts by volume) and hydroquinone (0.75 part by weight) was refluxed up a 3-ft. Vigreaux column fitted with a phase-separating still-head which continuously decanted the upper (aqueous) layer in the distillate and returned the lower layer to the column as reflux. When no more water was being separated (after 30 hours) a solution (15 parts by volume, 3.20 N) of anhydrous hydrogen chloride in isopropanol was added and refluxing, with separation of water (total 14 parts by volume), continued for a further 53 hours. No water separated during the last five hours heating.

The product was neutralised with a solution of sodium isopropoxide in isopropanol and distilled without fractionation. The distillate (132 parts by weight) of boiling point 95–100° C. at 18 mm. of mercury pressure was subsequently fractionated to give 1,1,3-tri-isopropoxybutane (100 parts by weight; 42.5% of theory), boiling point 88–89° C. at 9 mm. of mercury pressure, $n_D^{20}$ 1.4113–1.4124 (mainly 1.4113–1.4116). The fore-runnings from the fractionation contained a further small amount of the tri-isopropoxybutane. The purified product analysed as follows:

Found: C=67.0%; H=11.84%.
$C_{13}H_{28}O_3$ requires: C, 67.2%; H, 12.14%.

The oximation equivalent was 235 (theory=232.4).

The 2:4-dinitrophenylhydrazone of beta-isopropoxybutyraldehyde was prepared by adding 1 part by volume of tri-isopropoxybutane to a saturated solution of 2:4-dinitrophenylhydrazine in 2N-hydrochloric acid and shaking. The derivative was purified by chromatographing over acid-washed alumina, in benzene solution, and recrystallised from ethanol, to give yellow leaflets, melting point, 102.5°, which analysed as follows:

Found: C=50.4%; H=5.78%; N=18.3%.
$C_{13}H_{18}O_5N_4$ requires: C=50.3%; H=5.84%; N=18.1%.

The 2,4-dinitrophenylhydrazone of crotonaldehyde (melting point and mixed melting point with an authentic specimen=189° C.), was formed simultaneously with that of the beta-isopropoxybutyraldehyde in an approximately equal amount, by elimination of the isopropoxy group.

Example 9

A mixture of 173.2 parts by weight of acrolein (97% pure), 1800 parts by weight of isopropanol, and 400 parts by volume of methylene dichloride was dehydrated as described in Examples 1 and 2, then cooled and treated with 45 parts by volume of isopropanol containing 5.4 parts by weight of dissolved anhydrous hydrogen chloride. Azeotropic distillation was re-started and continued until no more water was liberated. The reaction mixture was treated with excess anhydrous sodium acetate and then worked-up as in Example 1 to give 287.7 parts by weight of 1,1,3-tri-isopropoxypropane. The yield was thus 44%.

In another, very similar, experiment in which the reagents were not dehydrated before the addition of the acid catalyst the yield of the tri-isopropoxy compound was only 28%.

We claim:

1. A process for the production of a 1,1,3-tri-sec-alkoxyalkane which comprises forming a mixture comprising a wet alpha-beta unsaturated lower aliphatic aldehyde and a water entrainer, first removing water as an azetrope with the entrainer, and then reacting the dehydrated aldehyde with a lower secondary alkanol in the presence of a condensation catalyst in the liqiud phase while removing azeotropically the water liberated by the condensation reaction.

2. A process according to claim 1 wherein the reaction is continued until no further water is liberated by the condensation whereupon the 1,1,3-tri-sec-alkoxyalkane is recovered from the reaction mixture.

3. A process according to claim 1 wherein the reaction mixture contains less than 2% of water at the start of the condensation reaction.

4. A process according to claim 1 wherein the alpha-beta unsaturated aldehyde is selected from the group consisting of acrolein and crotonaldehyde.

5. A process according to claim 1 wherein the secondary alkanol is selected from the group consisting of isopropanol and secondary-butanol.

6. A process according to claim 1 wherein the condensation reaction is carried out in the presence in the reaction mixture of a polymerisation inhibitor.

7. A process according to claim 1 wherein the condensation catalyst is a strong mineral acid.

8. A process according to claim 1 wherein the reaction is carried out at temperatures between 40° and 100° C.

9. A process for the production of 1,1,3-tri-isopropoxypropane which comprises forming a mixture comprising wet acrolein and a water entrainer, first removing water as an azeotrope with the entrainer, and then reacting the acrolein with isopropanol in the presence of a condensation catalyst in the liquid phase while removing azeotropically the water liberated by the condensation reaction.

10. A process for the production of 1,1,3-tri-isopropoxybutane which comprises forming a mixture comprising wet crotonaldehyde and a water entrainer, first removing water as an azeotrope with the entrainer, and then reacting the crotonaldehyde with isopropanol in the presence of a condensation catalyst in the liquid phase while removing azeotropically the water liberated by the condensation reaction.

11. A process for the production of 1,1,3-sec-alkoxyalkane which comprises reacting a dehydrated mixture of alpha-beta unsaturated lower aliphatic aldehyde and a lower secondary alkanol in the presence of a condensation catalyst in the liquid phase, and removing azeotropically the water liberated by the condensation reaction.

References Cited in the file of this patent

UNITED STATES PATENTS

| | | |
|---|---|---|
| 2,501,144 | Saunders | Mar. 21, 1950 |
| 2,535,458 | Robeson | Dec. 26, 1950 |
| 2,561,251 | Van Aardt et al. | July 17, 1951 |
| 2,691,685 | Freval et al. | Oct. 12, 1954 |